United States Patent [19]

Magilton

[11] Patent Number: 4,682,267

[45] Date of Patent: Jul. 21, 1987

[54] PANEL ALIGNMENT SYSTEM

[75] Inventor: Thomas C. Magilton, Newton, Iowa

[73] Assignee: The Maytag Company, Newton, Iowa

[21] Appl. No.: 891,484

[22] Filed: Aug. 1, 1986

[51] Int. Cl.[4] .............................................. H02B 1/00
[52] U.S. Cl. ................................................. 361/331
[58] Field of Search ............................... 200/293-296, 200/50 R; 361/331, 332, 334, 336, 346, 350, 351, 353, 354, 356-360, 362, 363, 376, 427; 248/27.1

[56] References Cited

U.S. PATENT DOCUMENTS

| | | | |
|---|---|---|---|
| 2,036,044 | 3/1936 | Hammer | 361/359 |
| 2,344,441 | 3/1944 | Lorenz | 361/360 X |
| 2,526,901 | 10/1950 | Robbins | 361/356 |
| 3,333,158 | 7/1967 | Speck | 361/363 X |
| 4,209,820 | 6/1980 | Rundel | 361/331 |
| 4,253,486 | 3/1981 | Hardin | 200/296 X |

Primary Examiner—J. R. Scott
Attorney, Agent, or Firm—Richard L. Ward

[57] ABSTRACT

A control center including a panel alignment system is provided for use with a control housing. A support member is mounted in the control housing for mounting a selector switch. A panel member is spaced forwardly from the support member and is movable relative thereto. The panel member includes an aperture for receiving the actuating shaft of the selector switch and further includes selector switch operating indicia. An alignment member is mounted to the support member at the selector switch location and includes a projecting portion engageable with the panel member for effecting a connection therebetween. The alignment member and the panel member are movable together to align the operating indicia with the actuating shaft. The alignment member further includes a locking portion for locking the alignment member and the panel member in place when alignment is achieved.

9 Claims, 4 Drawing Figures

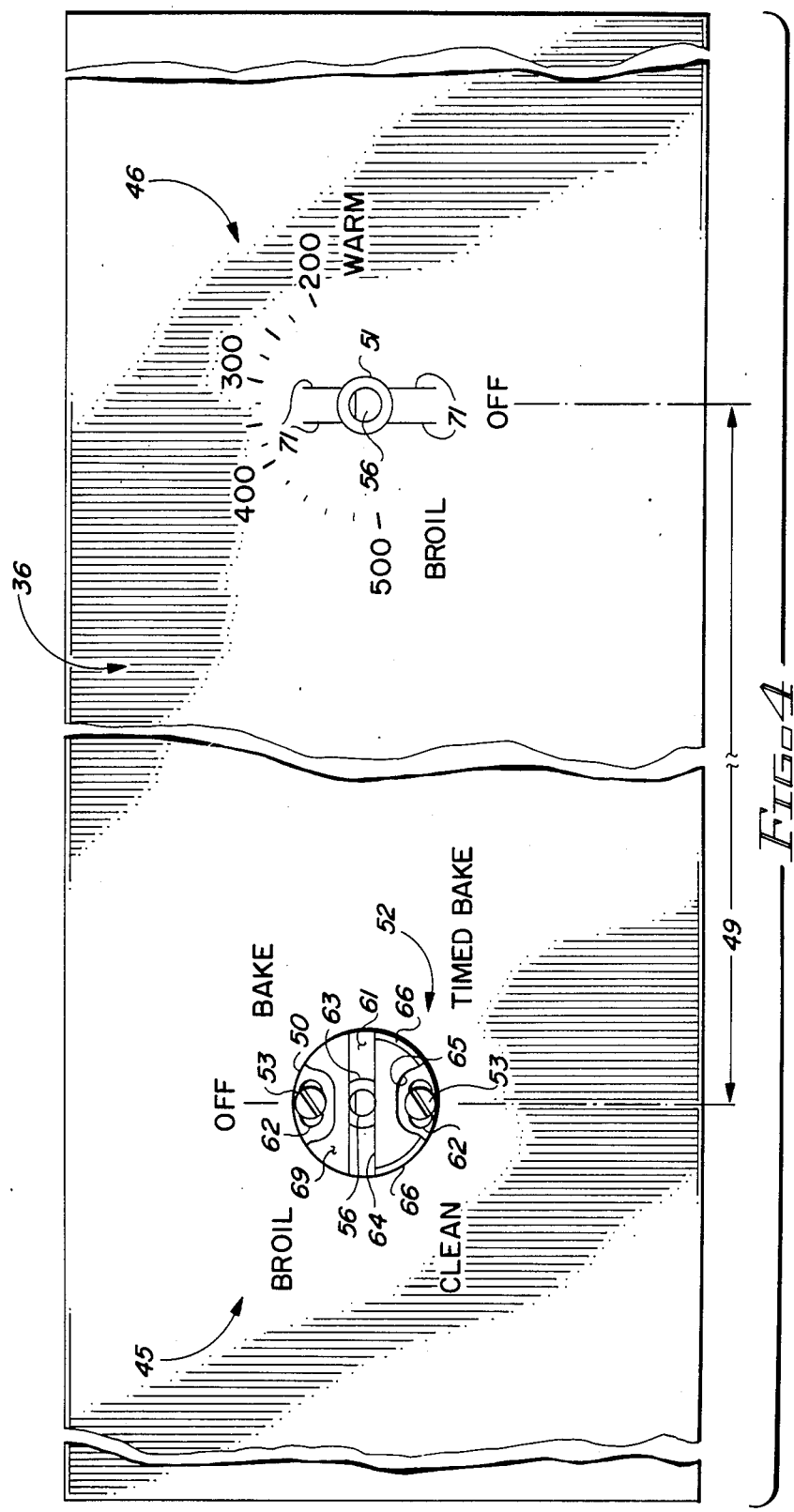

PANEL ALIGNMENT SYSTEM

BACKGROUND OF THE INVENTION

This invention relates to the field of appliance control centers and in particular to a system for aligning the actuating shafts of switches attached to one panel with operating indicia on another panel in a multi-panel control center construction.

In the design of appliance control centers, and especially those for ranges, it has been generally accepted practice to utilize a selector switch mounting panel or bracketry located within a control housing. The actuating shafts of the selector switches are allowed to extend through the mounting panel and toward an appliance operator. In many appliances a glass or plastic decorative panel is spaced in front of the switch mounting panel with the operating indicia for the selector switches silk screened or otherwise printed on the decorative panel. Generally, the operating indicia does not need to be closely aligned with the actuating shafts and therefore no attempt is made to provide such alignment. However, in some cases such as with oven thermostat settings, it is desirable that the operating indicia, in the form of temperature settings, be located accurately with respect to the actuating shafts to permit accurate setting of desired oven temperatures for baking.

In spite of the recognized desirability of accurately aligning the operating indicia of certain decorative panels with the actuating shafts of control switches mounted on other panels, there has been no known provision, until the instant invention, of such an alignment system. In the alignment system of the instant invention the decorative panel can be manipulated during assembly to align the operating indicia located on the decorative panel with the actuating shafts of the selector switches attached to the stationary selector switch mounting panel and once alignment is achieved, the decorative panel is locked in place.

SUMMARY OF THE INVENTION

It is therefore an object of the instant invention to provide an improved appliance control center.

It is a further object of the instant invention to provide a system for aligning selector switch operating indicia located on a decorative panel with the actuating shafts of selector switches attached to a switch mounting panel in a multiple panel control center construction.

Briefly, the instant invention achieves these objects in a control center including panel alignment apparatus. A control housing is provided and a control support member is mounted in the control housing. At least one selector switch is attachable to the control support member and includes a generally forwardly extending actuating shaft. A panel member is spaced from the control support member and is movable relative thereto. The panel member includes a portion defining an aperture for receiving the actuating shaft of the selector switch and further includes operating indicia associated with the aperture. Alignment apparatus is attachable to the control support member and includes a projecting portion engageable with the panel member for effecting a connection therebetween. Attaching means attaches one of the selector switch and alignment apparatus to the control support member in a relatively fixed position and the other in an adjustable position for limited movement relative to the control support member for aligning the operating indicia with the actuating shaft of the selector switch. The attaching means is operable for locking the alignment apparatus and the panel member in place when alignment is achieved.

Details of the panel alignment system and further objects and advantages thereof will become evident as the description proceeds and from an examination of the accompanying three sheets of drawings.

BRIEF DESCRIPTION OF THE DRAWINGS

The drawings illustrate a preferred embodiment of the invention with similar numerals referring to similar parts throughout the several views, wherein:

FIG. 4 is a view of the front of the decorative panel taken generally along lines 4—4 of FIG. 2.

DESCRIPTION OF A PREFERRED EMBODIMENT

Figure 1:
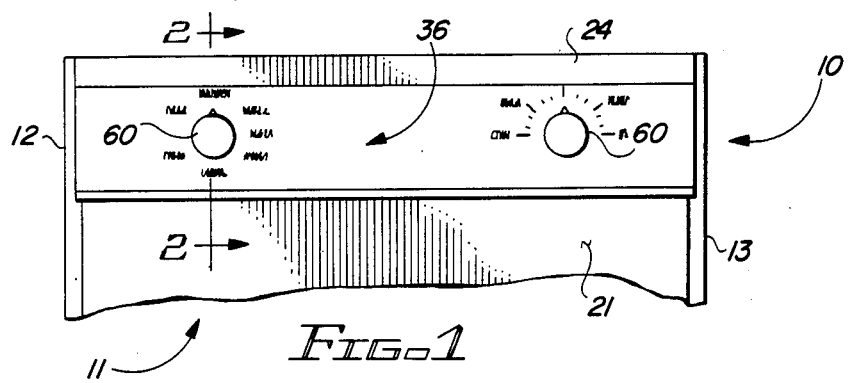
FIG. 1 is a front elevation view of a control center utilizing the panel alignment apparatus of the instant invention.
Figure 2:
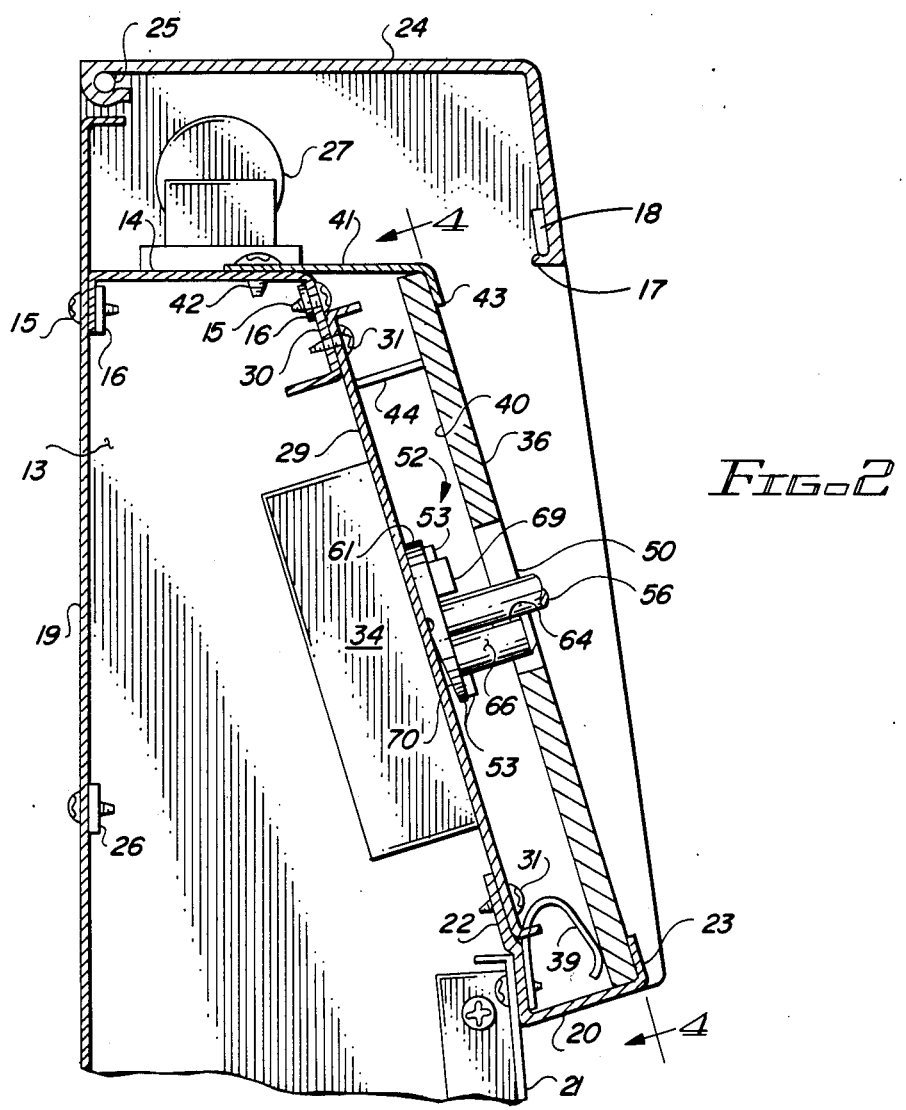
FIG. 2 is a section view taken generally along lines 2—2 of FIG. 1.

Referring now to the drawings and in particular to FIGS. 1 and 2, there is shown a control center including a control housing 10 for an appliance 11. The control housing 10 includes left and right end caps 12 and 13 which, in this embodiment, may be plastic moldings or die castings. The end caps 12 and 13 are mechanically fastened to the top cover (not shown) of the appliance 11 and provide support for the various channels and brackets which make up the control housing 10.

As best shown in FIG. 2, the control housing 10 includes an upper channel 14 having a substantially inverted U-shape and which extends from side to side between the end caps 12 and 13. The upper channel 14 is secured by threaded fasteners 15 to a pair of tabs 16 formed in each of the end caps 12 and 13. The upper channel 14 is located within the control housing 10 just below the top thereof and adjacent the rear panel 19.

As further shown in FIG. 2, a lower U-shaped channel 20 is secured to a front panel 21 of the control housing 10 and also extends between the end caps 12 and 13. This lower U-shaped channel 20 may be an extrusion or a stamped sheet metal part having a rear flange 22 which has substantially greater height than the front flange 23.

An access cover 24 is pivotally mounted between a pair of pins 25 formed in the end caps 12 and 13. The access cover 24 can be pivoted upwardly and rearwardly about the pins 25 to permit access to the interior of the control housing 10 for servicing a lamp 27. When in the closed position of FIG. 2, the access cover 24 also provides a decorative look to the upper portion of the control housing 10. As shown in FIG. 2, the access cover 24 includes a rearwardly projecting lip 17 which is engageable with a retaining lug 18 formed in each end cap 12 and 13. The lip 17 snaps over the lugs 18 to effectively hold the cover 24 in the closed position.

As further shown in FIG. 2, the rear of the control housing 10 is enclosed by the panel 19 which is fastened to the rear of the appliance 11 (not shown) and to tabs 26 formed in the end caps 12 and 13. The panel 19 encloses the rear of the appliance 11 and control housing 10 to preclude access to the electrical components.

Figure 3:
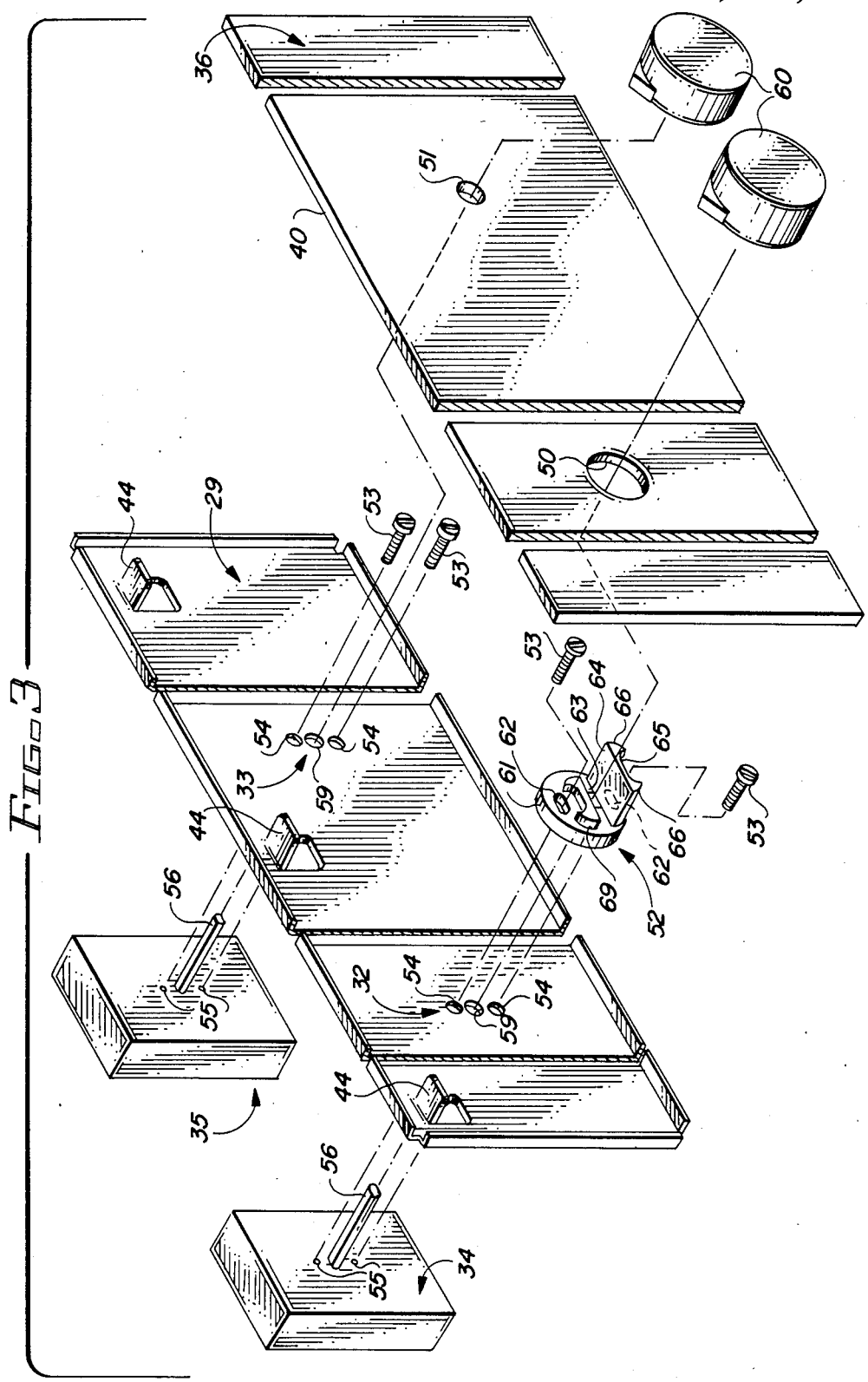
FIG. 3 is an exploded view showing the assembly of the panels of the instant invention.

Referring now to FIGS. 2 and 3, a switch mounting panel 29 is shown. As best shown in FIG. 2, the switch mounting panel 29 is mounted to the rear flange 22 of the lower U-shaped channel 20 and to a downwardly extending front flange 30 associated with the upper channel 14. The switch mounting panel 29 is secured to these flanges 22 and 30 by a plurality of threaded fasteners 31 and when assembled thereto the switch mounting panel 29 will be lying in a plane which is displaced from the vertical axis by approximately 18 degrees. The switch mounting panel 29 includes a plurality of clearance apertures 54 and 59 in groupings identified by numerals 32 and 33 for use in attaching at least a pair of selector switches 34 and 35 to the rear of the switch mounting panel 29 and which will be further discussed herein.

As further shown in FIG. 2, a decorative panel 36 of glass, metal or possibly plastic is spaced in front of the switch mounting panel and extends the full width of the control housing between the pair of end caps 12 and 13. A pair of inverted U-shaped spring clips 39 are located within the lower U-shaped channel 20 between the switch mounting panel 29 and the decorative panel 36. These spring clips 39 provide biasing force to the rear surface 40 of the decorative panel 36 for urging the decorative panel 36 into contact with the front flange 23 of the lower U-shaped channel 20. As still further shown in FIG. 2, a retaining bracket 41 is attached to the upper channel 14 by fasteners 42 and includes a downwardly turned edge 43 which is engageable with the top front surface of the decorative panel 36 for maintaining the decorative panel 36 in the posture of FIG. 2 against the forwardly turned stops 44 formed in the switch mounting panel 29.

In manufacturing the switch mounting panel 29 and the decorative panel 36, the spacing between the left grouping 32 of clearance apertures 54 and 59 and the right grouping 33 of clearance apertures 54 and 59 in the switch mounting panel 29 as well as the spacing between the left and right indicia patterns 45 and 46, shown in FIG. 4, and identified by dimension 49, can be accurately maintained. It has been found, however, that the placement or registration of the indicia patterns 45 and 46 with respect to the pair of clearance holes 50 and 51 in the decorative panel 36 can vary by as much as plus or minus 1/16 of an inch. To compensate for the possible eccentricity of the clearance holes 50 and 51 with respect to the left and right indicia patterns 45 and 46 on the decorative panel 36, a panel alignment system has been devised and includes a molded plastic alignment member 52 as shown in FIGS. 2–4.

As best shown in FIGS. 2 and 3, at least a pair of spaced-apart selector switches 34 and 35 are mounted to the rear of the switch mounting panel 29 by means of a pair of threaded fasteners 53 which pass through the pair of clearance apertures 54 associated with the left and right groupings 32 and 33 in the switch mounting panel 29 and into tapped holes 55 in the selector switches 34 and 35. Each selector switch 34 or 35 includes an actuating shaft 56 extending forwardly through the center clearance aperture 59 associated with the left and right groupings 32 and 33 in the switch mounting panel 29 and through the generally aligned clearance holes 50 and 51 in the decorative panel 36 toward an appliance operator. In the preferred embodiment shown herein the actuating shafts 56 of the selector switches 34 and 35 are located in a generally horizontal plane. It is, however, anticipated that the control panel could be oriented with the actuating shafts 56 in a substantially vertical plane. As further shown in FIG. 3, control knobs 60 are pushed onto the actuating shafts 56 to complete the assembly.

The alignment member 52 is physically located between the switch mounting panel 29 and the decorative panel 36. In the preferred embodiment of the invention, the alignment member 52 is located at the mounting position of one of the selector switches 34 or 35. Although the alignment member 52 may take on a variety of configurations, the preferred embodiment shown in FIGS. 2–4 includes a generally cylindrical body portion 61. As best shown in FIGS. 3 and 4, the body portion 61 includes substantially horizontally disposed slots 62 and 63 which correspond to and are aligned with the clearance apertures 54 and 59 in the switch mounting panel 29. Two of these horizontally disposed slots 62 receive the threaded fasteners 53 for mounting the selector switch 34 and the center slot 63 allows passage of the switch actuating shaft 56. The horizontally disposed slots 62 and 63 permit side-to-side movement of the alignment member 52 with respect to the switch mounting panel 29 until the threaded fasteners 53 are tightened.

As further shown in FIGS. 2–4, the alignment member 52 also includes a finger portion 64 extending forwardly from the lower half of the body portion 61 and toward the decorative panel 36. The bottom-center of the finger portion 64 has a notch 65 for clearing the lower slot 62 and the head of the threaded fastener 53 as best shown in FIGS. 3 and 4. The finger portion 64 of the alignment member 52 further includes an arcuate segment 66 on each side of the notch 65 having a radius substantially identical to the radius of the clearance hole 50 in the decorative panel 36. The finger portion 64 extends forwardly into the clearance hole 50 and the arcuate segments 66 are engageable with the sides of the clearance hole 50 in the decorative panel 36 as best shown in FIG. 2. Thus, the alignment member 52 and the decorative panel 36 may be simultaneously moved from side to side.

The alignment member 52 of the preferred embodiment has a shoulder portion 69 of the same configuration as the finger portion 64 but extending only a short distance forward of the body portion 61 as shown in FIGS. 2 and 3. The purpose of the shoulder portion 69 is to provide a stiffener for the body portion 61. As best shown in FIG. 2, it is noted that the rear wall 70 of the lower half of the body portion 61 is forwardly tapered away from the switch mounting panel 29. Because of this taper, when the lower threaded fastener 53 is tightened the lower half of the body portion 61 will pivot downwardly and the finger portion 64 will engage and gently bias the decorative panel 36 downwardly into contact with the lower U-shaped channel 20 to lock the decorative panel 36 in place.

Briefly, to assemble the selector switches 34 and 35 to the switch mounting panel 29 and to align the left and right indicia patterns 45 and 46 of the decorative panel 36 with the actuating shafts 56 of the selector switches 34 and 35 requires the following steps: The right selector switch 35 is secured to the rear of the switch mounting panel 29 by inserting the actuating shaft 56 through the center aperture 59 and securely tightening the threaded fasteners 53. The left selector switch 34 is loosely mounted by inserting the actuating shaft 56 through the center aperture 59 and sliding the center slot 63 of the alignment member 52 over the actuating shaft 56 with the finger portion 64 down. The top and bottom fasteners 53 are started but are not tightened. The decorative panel 36 is inserted into the lower U-shaped channel 20 against the U-shaped spring clips 39 and is rotated backward so that the actuating shafts 56 of the selector switches 34 and 35 pass through the clearance holes 50 and 51 and the finger portion 64 of the alignment member 52 enters and engages with the left clearance hole 50. As shown in FIG. 4, the decorative panel 36 includes alignment marks 71 at the right indicia pattern 46. The actuating shaft 56 of the right selector switch 35 is aligned with the indicia pattern 46 by simultaneously moving the decorative panel 36 and the alignment member 52 to position the actuating shaft 56 of the right selector switch 35 between the alignment marks 71. The top fastener 53 for the left selector switch 34 is tightened first and then the bottom fastener 53 is tightened to pivot the finger portion 64 of the alignment member 52 downwardly into holding contact with the clearance hole 50 in the decorative panel 36 to lock the decorative panel 36 in the aligned posture. Because the dimension 49 between the sets of clearance apertures 32 and 33 in the switch mounting panel 29 and the dimension 49 between the operating indicia patterns 45 and 46 on the decorative panel 36 can be closely maintained, once the right indicia pattern 46 is aligned with the right selector switch 35, the left indicia pattern 45 and left selector switch 34 will also be aligned. In an alternate embodiment it is possible that the numerical information included in the indicia patterns 45 and 46 could be placed on a "skirt" associated with the control knobs 60. In this instance, the indicia consisting of "tick" marks indicative of a start position would be placed on the decorative panel 36 and aligned with the selector switch actuating shafts 56.

It is anticipated that the alignment system disclosed herein could also be applied when only one selector switch is present and therefore only one actuating shaft and indicia pattern would need to be aligned. In this case, the decorative panel 36 is moved to align the single indicia pattern with the single actuating shaft and the fasteners 53 are tightened as previously discussed to lock the decorative panel 36 in the aligned posture.

There has thus been shown an improved appliance control housing. This improved control housing includes means for aligning indicia patterns on a decorative panel with the actuating shafts of selector switches mounted on a switch mounting panel and for locking the decorative panel in place when alignment is achieved.

In the drawings and specification there is set forth a preferred embodiment of the invention and although specific terms are employed these are used in a generic and descriptive sense only and not for purposes of limitation. Changes in the form and the proportion of parts as well as the substitution of equivalents are contemplated as circumstances may suggest or render expedient without departing from the spirit or scope of the invention as defined in the following claims.

I claim:

1. A control center including panel alignment apparatus, the combination comprising: means defining a control housing; control support means mounted in said control housing; at least one selector switch attachable to said control support means, said selector switch having a generally forwardly extending actuating shaft; a panel member spaced from said control support means and movable relative thereto, said panel member defining an aperture for receiving said actuating shaft, said panel member further including operating indicia associated with said aperture; alignment means attachable to said control support means and including a projecting portion engageable with said panel member for effecting a connection therebetween; and means for attaching one of said selector switch and said alignment means to said control support means in a relatively fixed position and the other in an adjustable position for limited movement relative to said control support means, said actuating shaft being disposed in said aperture and said alignment means being connected to said panel member with said selector switch and said alignment means in said fixed and adjustable positions whereby said actuating shaft and said operating indicia on said panel member are cooperably disposed, the other of said selector switch and said alignment means being movable from said adjustable position for aligning said operating indicia with said actuating shaft of said selector switch, said means for attaching being operable for locking the other of said selector switch and said alignment means in place when alignment is achieved.

2. A control center including panel alignment apparatus as defined in claim 1 wherein said alignment means is attached in said adjustable position and includes a plurality of slots cooperable with said means for attaching to permit said limited movement relative to said control support means.

3. A control center including panel alignment apparatus, the combination comprising: means defining a control housing; control support means mounted in said control housing; at least one selector switch attachable to said control support means, said selector switch having a generally forwardly extending actuating shaft; means for attaching said selector switch to said control support means; a panel member spaced from said control support means and movable relative thereto, said panel member including a portion defining an aperture for receiving said actuating shaft, said panel member further including operating indicia associated with said aperture; and alignment means between said control support means and said panel member including a body portion having means cooperable with said means for attaching to mount said body portion on said control support means for limited movement relative thereto, said alignment means further including a projecting portion engageable with said panel member, said alignment means and said panel member being manually movable together for aligning said operating indicia with said actuating shaft of said selector switch, said means for attaching being operable for locking said alignment means and said panel member in place when alignment is achieved.

4. A control center including panel alignment apparatus as defined in claim 3 wherein said projecting portion of said alignment means is engageable with said portion defining an aperture in said panel member.

5. A control center including panel alignment apparatus, the combination comprising: means defining a control housing; control support means mounted in said control housing; at least a pair of selector switches spaced a predetermined distance apart and attachable to said control support means, each of said selector switches having a generally forwardly extending actuating shaft; means for attaching said selector switches to said control support means; a panel member spaced from said control support means and movable relative thereto, said panel member including portions defining at least a pair of apertures for receiving said actuating shafts of said selector switches, said panel member further including operating indicia spaced the same predetermined distance apart as said selector switches and associated with said apertures; alignment means between said control support means and said panel member including a body portion having means cooperable with said means for attaching to mount said body portion on said control support means for limited movement relative thereto, said alignment means further including a projecting portion engageable with said panel member, said alignment means and said panel member being manually movable together for aligning said operating indicia with said actuating shafts of said selector switches; and means included in said alignment means and operably associated with said control support means for locking said alignment means and said panel member in place when alignment is achieved.

6. A control center including panel alignment apparatus as defined in claim 5 wherein said alignment means is mounted on said control support means at the attachment location of one of said selector switches and includes portions defining a plurality of slots cooperable with said means for attaching for enabling said limited movement of said alignment means relative to said control support means.

7. A control center including panel alignment apparatus as defined in claim 5 wherein said projecting portion of said alignment means includes a finger-like projection extending into one of said apertures in said panel member and engageable with said portion defining said one aperture.

8. A control center including panel alignment apparatus as defined in claim 7 wherein said means for locking includes a tapered wall segment of said body portion adjacent said control support means, said tapered wall segment being deformable responsive to operation of said means for attaching to effect pivoting of said finger-like projection into locking engagement with said aperture for securing said panel member in place.

9. A control center including panel alignment apparatus, the combination comprising: means defining a control housing; a first elongated panel member mounted in said control housing; at least a pair of selector switches spaced a predetermined distance apart and attachable to said first elongated panel member, each of said selector switches having a generally forwardly extending actuating shaft; fastener means for attaching said selector switches to said first elongated panel member; a second elongated panel member spaced from said first elongated panel member and movable relative thereto, said second elongated panel member including portions defining at least a pair of apertures for receiving said actuating shafts of said selector switches, said second elongated panel member further including switch operating indicia spaced the same predetermined distance apart as said selector switches and associated with said apertures; alignment means between said first and second elongated panel members including a body portion having means defining a plurality of slotted holes for receiving said fastener means and the actuating shaft of one of said pair of selector switches and for mounting said alignment means on said first elongated panel member for limited movement relative thereto, said alignment means further including a finger-like projection extending toward said second elongated panel member and extending into one of said pair of apertures in said second elongated panel member and engageable with said portion defining said one aperture, said alignment means and said second elongated panel member being manually movable together by way of said slotted holes in said alignment means to align said switch operating indicia with said actuating shafts of said selector switches; and locking means defined by a tapered wall segment of said alignment means adjacent said first elongated panel member and said finger-like projection, said tapered wall segment being pivotally movable in response to the tightening of said fastener means for effecting movement of said finger-like projection into locking engagement with said aperture.

* * * * *